United States Patent [19]

Musselmann et al.

[11] Patent Number: 4,493,766
[45] Date of Patent: Jan. 15, 1985

[54] ROTATING SORTER FOR FIBER MATERIAL SUSPENSIONS

[75] Inventors: Walter Musselmann; Herbert Kinzler; Josef Trä, all of Heidenheim, Fed. Rep. of Germany

[73] Assignee: J. M. Voith GmbH, Heidenheim, Fed. Rep. of Germany

[21] Appl. No.: 381,242

[22] Filed: May 24, 1982

[30] Foreign Application Priority Data

Jun. 2, 1981 [DE] Fed. Rep. of Germany ....... 3121855

[51] Int. Cl.³ .............................................. B07B 1/20
[52] U.S. Cl. .................................. 209/362; 209/273; 210/415
[58] Field of Search ...................... 209/44.1, 606, 621, 209/632, 301, 362, 634, 680, 273; 210/433.1, 512.1, 512.3, 359, 360.1, 360.2, 413–415

[56] References Cited

U.S. PATENT DOCUMENTS

| 3,513,642 | 5/1970 | Cornett | 210/512.1 X |
| 3,724,674 | 4/1973 | Loison | 210/512.1 |
| 3,807,568 | 4/1974 | Ruthrof | 210/433.1 X |
| 4,108,778 | 8/1978 | Lambert et al. | 210/512.1 X |
| 4,216,095 | 8/1980 | Ruff | 210/512 R |

FOREIGN PATENT DOCUMENTS 2131201 11/1972 France ............... 210/360.2

Primary Examiner—Randolph Reese
Assistant Examiner—Glenn B. Foster
Attorney, Agent, or Firm—Jeffers, Irish & Hoffman

[57] ABSTRACT

A rotating sorter is provided for the removal of minuscule pollutants from fiber material suspensions by means of a symmetrical fixed filter basket disposed in a fixed spiral-shaped housing and in whose interior a generally vertical axle rotates sorter vanes in close proximity to the filter basket. Fiber material suspension to be sorted is delivered to a generally ring-shaped sorting space formed between the filter basket and housing. The direction of flow of fiber material suspension delivered to the filter basket occurs substantially tangentially thereto and generally perpendicular to the rotating axle, and quality material is sorted into the interior of the filter basket. The apparatus of the present invention is distinguished by an inlet nozzle which communicates with the sorting space through a generally vertically disposed slit, and by the sorting space steadily narrowing or tapering from a width equal to the width of the slit and along the axial length of the filter basket beginning at least at a point level with the slit, whereby the tapering of the sorting space occurs in a spiral fashion in the direction of flow of the fiber material suspension along the filter basket. This results in a higher degree of sorting effectiveness, especially in preventing the removal of long fibers with ejected material.

8 Claims, 3 Drawing Figures

ROTATING SORTER FOR FIBER MATERIAL SUSPENSIONS

In some prior art rotating sorters, an example of which is disclosed through DE-PS No. 12 95 344, the fiber material suspension intake occurs into the interior of the filter basket. Although the sorting effectiveness of these particular sorters is very good, the problem of relatively long fibers of certain fibrous material suspensions being sorted out and ejected with refuse still exists. The sorting out and ejection of long fibers with refuse is generally termed fractionating.

One of the objects of the present invention is to provide a rotating sorter having a high degree of sorter effectiveness with minimal fractionating. This particular object is accomplished by providing a material inlet nozzle which communicates with the sorting space through a generally vertical slit disposed at the interface therebetween. Further, the height of the sorting space begins at least at the height of the slit and continually diminishes or tapers in the direction of material suspension flow in a spiral-like manner substantially over the axial length of the housing within which the filter basket is disposed.

The fiber material suspension to be sorted is injected into the housing through the inlet nozzle at a high tangential velocity. Due to this, the fiber material suspension flow strikes the filter basket openings at a very shallow angle, thereby causing the fibers to align themselves in a generally circumferential direction resulting in a thickening of the fibers at the filter surface. By means of the spiral-shaped casing or housing, the thickness of the fiber layer on the filter surface is generally even or uniform, which allows fibers of relatively long length to pass through the filter. In this manner, the fractioning effect is diminished, which is especially advantageous when using very fine filters, and the use of filters having very small filter orifices, for example, widths of from about 0.2–0.3 millimeters, are possible.

The structure and operation of the rotating sorter of the present invention is also in principle different from another similar apparatus disclosed through DE-OS No. 28 30 386. In these particular prior art rotating sorters, there is no thickening of the fiber material suspension in the direction of flow before the filter basket since the suspension is desired to flow along the filter basket generally parallel to the producer toward the outlet. Consequently, long fiber pollutants, for example, hairs and splinters, may not get through the filter. Further, there is no tangential flow of fiber material suspension around the filter basket as is provided in the rotating sorter of the present invention. It is for this reason to be expected that the undesirable effects of fractionating will occur or be favored in this particular prior art sorter. Additionally, a precise small number of revolutions is preferred and the rotary drum, or jacket is preferably cylindrically shaped having bumps or short rails thereon.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein.

DESCRIPTION OF A PREFERRED EMBODIMENT

Figure 1:
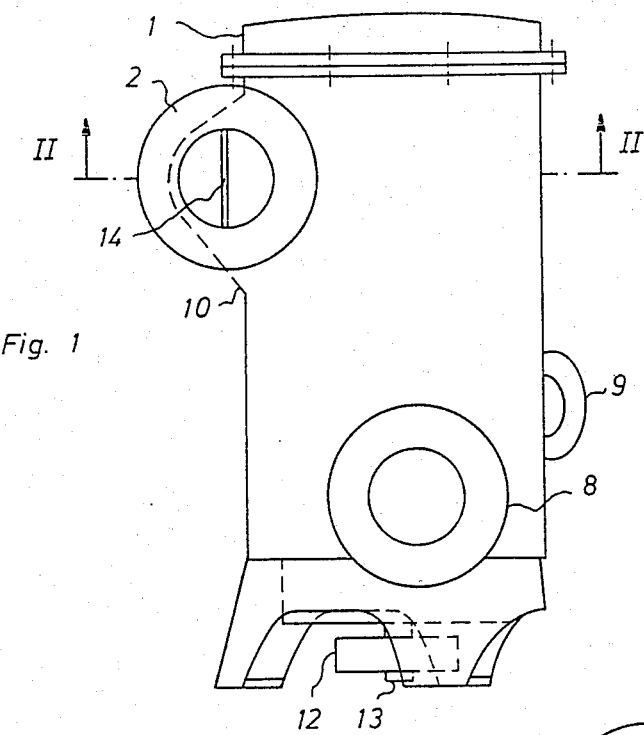
FIG. 1 is a front elevational view of a preferred embodiment of the present invention.
Figure 3:
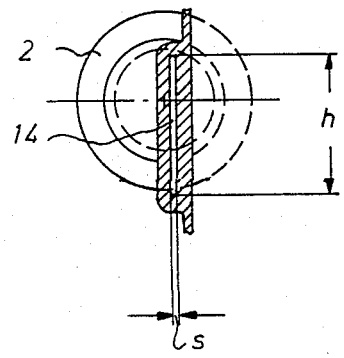
FIG. 3 is a sectional view of FIG. 2 taken along line 3—3 and viewed in the direction of the arrows.

Referring to the figures, there is illustrated rotating sorter casing 1, filter basket 4, and rotating sorter vanes 5 connected by supporting braces 6 to generally vertical axle 7. Also provided are material inlet 2, quality ejection outlet 8, and refuse outlet 9. Sorting space 3 is defined between spiral casing 1' and filter basket 4 and which transports refuse in an axial direction to refuse outlet 9. In this particular embodiment, the rotating sorter is provided with a spiral casing 1' extending the entire height of filter basket 4, and an inlet nozzle 10. A fiber material suspension is injected with great speed through nozzle 10 and nozzle orifice 14 onto spiral casing 1' so that it initially flows tangentially around filter basket 4, and since this tangential flow direction contributes little to the radial flow direction through filter basket 4, the suspension is dammed up in a relatively large degree and thickens because of the strong tangential direction of the fibers. Because of the formation of this thickened layer, long fibers have a greater probability of passing through filter orifices (not shown) in filter basket 4 and quality ejection outlet 8, while on the other hand, pollutants of especially small grain size are in large measure transported to and through refuse outlet 9.

Although the formation of the thickened layer tends to somewhat impair sorter performance, this is more than compensated by the greatly reduced effects of fractionating. The preferred inlet velocity generally exists between about 18 and about 20 meters per second, but may also satisfactorily exist within the range of about 12 to about 24 meters per second, thereby approximately corresponding to the velocity of sorter vanes 5. High velocities are indicated for high permeation performances of about 3000–4000 revolutions per minute, and the lower permeation performances at about 2000 revolutions per minute.

Preferred ratio values of height to width of nozzle orifice 14, i.e., h/s wherein h is the height of nozzle orifice 14 and s the radial width of nozzle orifice 14 at sorting space 3, have been calculated to be between about 10 and about 40, and preferably between about 15 and about 30.

Lower velocities for sorter vanes 5 lie in the range from about 12 to about 16 meters per second with the smaller throughput of about 2000 revolutions per minute and the greater velocities lie in the range from about 20 to about 24 meters per second with larger throughputs of about 4000 revolutions per minute.

With the parameters above in mind and referring to nozzle orifice 14, the height, h, of nozzle orifice 14 is preferably 250 millimeters and the widths of nozzle orifice 14 on filter basket 4 is between about 8 and about 11 millimeters, and about 11 to about 13 millimeters, respectively.

Figure 2:
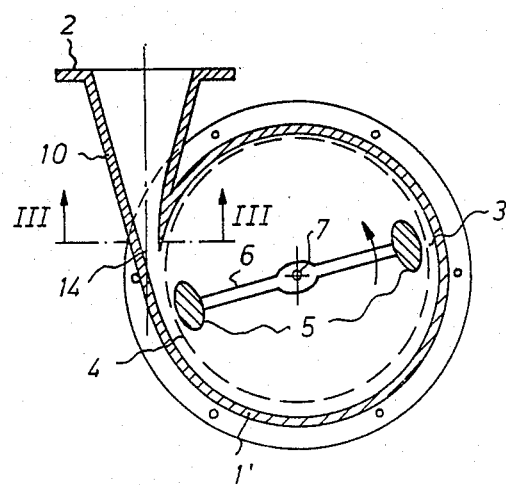
FIG. 2 is a sectional view of FIG. 1 taken along line 2—2 and viewed in the direction of the arrows.

Referring to FIG. 2, the cross sectional view provided of sorter vanes 5 has the generally known shape of an airfoil for a wing. Experience has shown that the sorter performance and effectiveness is increased by the low and overpressures produced at filter basket 4 by the rotation of sorter vanes 5, and is especially effective in preventing clogging of the filter orifices.

Rotation of vertical axle 7 and sorter vanes 5 is provided by belts (not shown) engaging belt pulley 12 secured to rotor axle 13.

While this invention has been described as having a specific embodiment, it will be understood that it is capable of further modifications. This application is therefore intended to cover any variations, uses, or adaptations of the invention following the general principles thereof, and including such departures from the present disclosure as come within known or customary practice in the art to which the invention pertains and fall within the limits of the appended claims.

What is claimed is:

1. A rotating sorter for eliminating minuscule pollutants from fiber material suspensions of the type including a generally vertically disposed fixed housing having a fixed filter basket therein, said generally vertically disposed fixed housing and said fixed filter basket forming therebetween a generally ring-shaped sorting space for receiving fiber material suspensions to be sorted, a rotatable axle member generally vertically disposed in said filter basket and having a plurality of sorter vanes radially extending therefrom to rotate therewith, the remote end portions of said sorter vanes being in close proximity to said filter basket, wherein quality material is sorted into the interior of said filter basket and the delivery of fiber material suspension to be filtered occurs substantially tangentially to said filter basket and substantially perpendicular to the axis of rotation of said rotatable axle member, the improvement comprising:

an inlet member communicating with said sorting space through a generally vertically disposed slit at the interface of said inlet member and said sorting space, said slit having a relatively high ratio of its height to its width, said sorting space extending from said generally vertically disposed slit substantially the entire circumference of said generally vertically disposed fixed housing and narrowly tapering spirally in a plane along the entire circumference and in a direction of flow of fiber material suspension to be sorted.

2. The rotating sorter of claim 1 wherein the ratio of the height to width of said slit is between about 10 and about 40.

3. The rotating sorter of claim 2 wherein the ratio of the height to width of said slit is between about 15 to about 30.

4. The rotating sorter of claim 1 wherein said inlet member is generally nozzle-shaped and in communication with said sorting space through said slit.

5. The rotating sorter of claim 1 wherein said slit extends approximately half of the height of said filter basket.

6. The rotating sorter of claim 1 wherein said housing is generally spirally-shaped and extends the entire length of said filter basket.

7. The rotating sorter of claim 1 wherein the width of said sorting space at said slit is equal to the width of said slit.

8. The rotating sorter of claim 1 wherein said remote end portions of said sorter vanes are formed as guiding ledges and have transverse cross-sectional shapes of an airfoil.

* * * * *